United States Patent [19]

Clark et al.

[11] Patent Number: 4,991,398
[45] Date of Patent: Feb. 12, 1991

[54] COMBUSTOR FUEL NOZZLE ARRANGEMENT

[75] Inventors: Jim A. Clark, Jupiter; James H. Shadowen, Riviera Beach; Thomas L. DuBell, Palm Beach Gardens, all of Fla.

[73] Assignee: United Technologies Corporation, Hartford, Conn.

[21] Appl. No.: 296,155

[22] Filed: Jan. 12, 1989

[51] Int. Cl.⁵ .................................................. F02C 1/00
[52] U.S. Cl. ....................................................... 60/748
[58] Field of Search .................. 60/738, 746, 747, 748

[56] References Cited

U.S. PATENT DOCUMENTS

| | | | |
|---|---|---|---|
| 2,595,999 | 5/1952 | Way et al. | 60/752 |
| 2,647,369 | 8/1953 | Leduc | 60/747 |
| 3,153,323 | 10/1964 | Hamm | 60/746 |
| 3,720,058 | 3/1973 | Collinson et al. | 60/746 |
| 4,246,758 | 1/1981 | Carvel et al. | 60/747 |
| 4,765,146 | 8/1988 | Hellat et al. | 60/746 |

Primary Examiner—Louis J. Casaregola
Assistant Examiner—Timothy S. Thorpe
Attorney, Agent, or Firm—Norman Friedland

[57] ABSTRACT

The fuel nozzles in the combustor of a gas turbine engine are concentrically disposed in two tiers about the circumference of the dome and are arranged in a triangular pattern with the air swirl orientation providing an increased intensity of combustion so as to enable a reduction in combustor size and weight while increasing temperature rise and the overall thrust-to-weight ratio of the engine.

1 Claim, 3 Drawing Sheets

COMBUSTOR FUEL NOZZLE ARRANGEMENT

TECHNICAL FIELD

This invention relates to gas turbine engines for powering aircraft, and more particularly to the fuel nozzle arrangement for the combustor in the engine.

BACKGROUND ART

To power higher and higher performance aircraft, the aircraft gas turbine industry is expending significant effort in attempting to increase the thrust-to-weight ratio of its engines. Greater thrust can be achieved in part by increasing the burner temperature rise, and weight reduction is obtained in part by shortening the combustor. One vehicle for attaining increased temperature rise without sacrificing flame stability is a double annular burner, exemplified in U.S. Pat. No. 4,194,358, granted to R. E. Stenger on Mar. 25, 1980. However, while double annular burners are capable of increased temperature rise, they have the disadvantage of increasing dome height and combustor surface area, which increases engine weight.

In both double annular and conventional single annular burners, a major factor limiting the combustor volumetric heat release rate is the rate of mixing between fuel and air. Fuel-injectors/air-swirlers in the combustor dome are quite effective mixing devices, but regions of relatively low mixing, and therefore low volumetric heat release, exist in areas adjacent to the swirlers. Because the combustor interior is not uniformly occupied by high intensity burning, a longer combustor is needed to ensure combustion is complete before the product gases enter the turbine.

Swirl orientation could be used to improve the uniformity of high intensity combustion in single and double annular burners, but normally it is not so used, for combustor durability reasons. If adjacent swirlers had alternating swirl orientations, e.g., first swirler: clockwise, second swirler: counterclockwise, third swirler: clockwise, etc., the fuel-air mixture near the periphery of one swirler would always be flowing in the same direction as the peripheral flow from the adjacent swirler. Thus, the two swirlers would reinforce one another, increasing the mixing and burning rate between swirlers. However, combustors with all swirlers at a constant radius, or double annular combustors with two rows of swirlers separated by an intervening wall, usually have the same swirl orientation for all swirlers because of the need to avoid thermal distress of the burner liner. With all swirl orientations the same, flow at the periphery of one swirler opposes the direction of flow near the edge of the adjacent swirlers, thereby preventing hot gases from any swirler from impinging on the combustor walls. The deleterious side effect of a common swirl orientation is the creation of low intensity combustion regions between swirlers.

DISCLOSURE OF THE INVENTION

An object of this invention is to provide an improved combustor for a gas turbine engine.

A feature of this invention is the triangular arrangement of fuel injectors in the dome of the combustor to increase the intensity of combustion so as to enable a reduction in combustor size and weight while increasing the burner temperature rise and the overall thrust-to-weight ratio of the engine.

A further feature is the orientation of the swirl component of the air issuing from each of said fuel injectors to reinforce the swirl introduced by adjacent swirlers without directing the reinforced-swirl, hot combustion products against the walls of the burner liner.

The foregoing and other features and advantages of the present invention will become more apparent from the following description and accompanying drawings.

BEST MODE FOR CARRYING OUT THE INVENTION

While the invention herein is described using schematic illustrations of combustors, it is to be understood that the fabrication of the combustors, the fuel injectors, and the supporting structures are well known in the art and examples of typical installations can be found in such aircraft engines as the PW 4000, PW 2000 and F 100 series of engines manufactured by Pratt and Whitney of United Technologies Corporation, the assignee of this patent application.

Suffice it to say that the combustor is of the annular type having an outer annular shaped liner and an inner annular shaped liner defining a combustion chamber that consists of a combustion zone and a dilution zone. The liner may conform to a suitable louver or Floatwall liner construction made from materials capable of withstanding the high temperatures associated with high speed aircraft. In a typical embodiment, the annular combustor carries a dome interconnecting the inner and outer liners at the forward end that serves to close the forward end of the combustion chamber and support a plurality of fuel injectors that deliver the fuel and air into the combustion zone. The air is ingested into the engine and its pressure and temperature are raised by suitable compressors before being supplied to the combustor. For the sake of understanding this invention, a portion of the air is supplied into the combustion zone through the air swirlers around the fuel nozzles, which may be of the pressure atomizing type or the airblast type, a portion of air is supplied through the combustor air holes, formed in the combustor liner downstream of the fuel injectors, and a portion of the air is used to cool the liner by inserting the cooling air along the combustor walls.

Figure 1A:
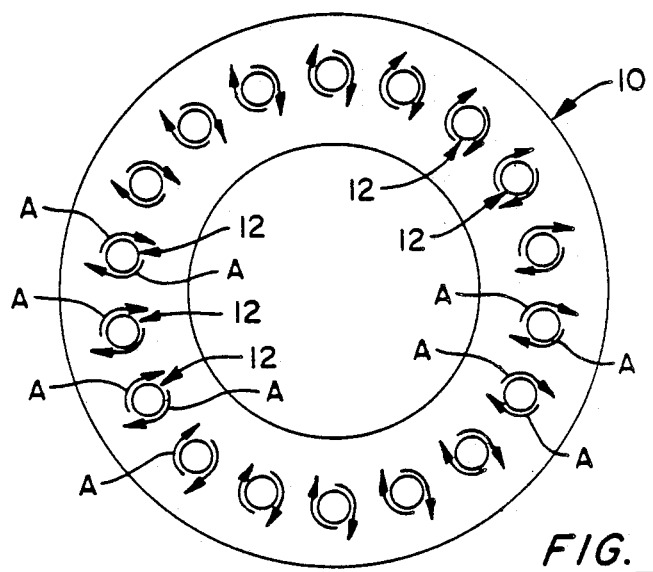
FIG. 1a is a schematic illustration of the dome and fuel injector locations of a typical prior art combustor.
Figure 1B:
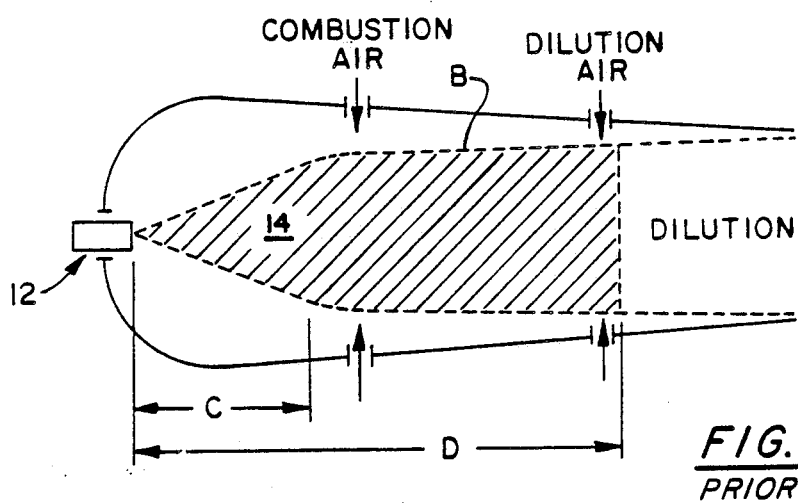
FIG. 1b is a schematic of the combustor of FIG. 1a, showing the regions of higher and lower combustion intensity.
Figure 1C:
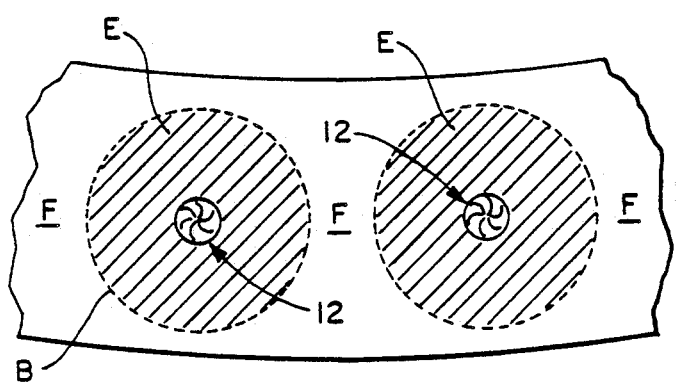
FIG. 1c is an enlarged schematic view of FIG. 1a, showing two adjacent fuel nozzles.

To better appreciate this invention, reference should be made to FIGS. 1a, 1b, and 1c, showing a typical prior art arrangement of fuel injectors mounted in the dome of a combustor. As mentioned earlier, it is customary to locate each of the equally spaced fuel injectors at a constant radius around the dome of the combustor. It is also typical of these prior art installations to have the same air swirl orientation in each of the fuel injectors, i.e., all swirlers impart a clockwise swirl or else all swirlers impart a counterclockwise swirl to the air they admit to the combustor.

As noted FIG. 1a, the dome of the combustor represented by reference numeral 10 contains equally spaced fuel injectors represented by the circles 12, it being understood that the fuel injectors contain an orifice for issuing fuel to the combustion zone and an air swirler for issuing air into the combustion zone. As the name implies, the swirler imparts a swirl to the air prior to being ingested in the combustion zone and the orientation or direction of the swirl is controlled by the design of the swirler. The arrows A in this example shows that the swirl direction is clockwise and all swirls have the same orientation. While it is possible to alternate the orientation of adjacent swirlers, to do so would adversely affect the life of the liner because hot gases would be directed against the liner wall. Hence, the mutual swirl reinforcement resulting from adjacent swirlers having opposite swirl orientations would be obtained at the expense of combustor durability, and hence alternating swirl orientation is not acceptable in modern conventional combustors of the single annular or double annular type.

As noted in FIG. 1b, the high intensity combustion in the primary zone 14 indicated by the shaded region B of the combustor does not fully occupy the combustor volume. Thus, the combustor is larger than might otherwise be required.

Figure 2A:
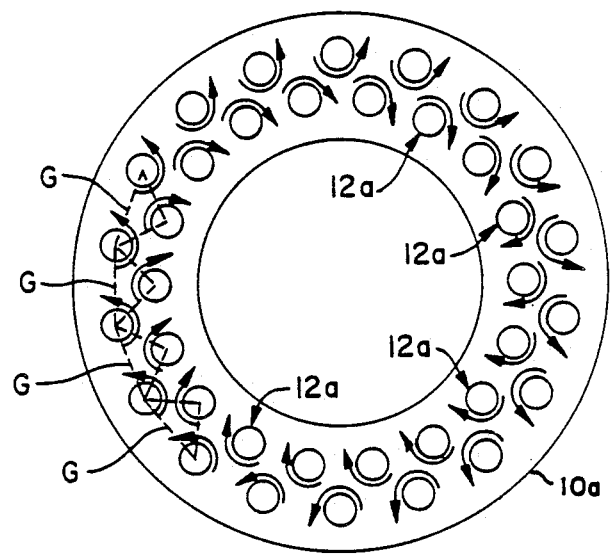
FIG. 2a is a schematic illustration of the dome and triangular arrangement of fuel injectors in a combustor utilizing the present invention.
Figure 2B:
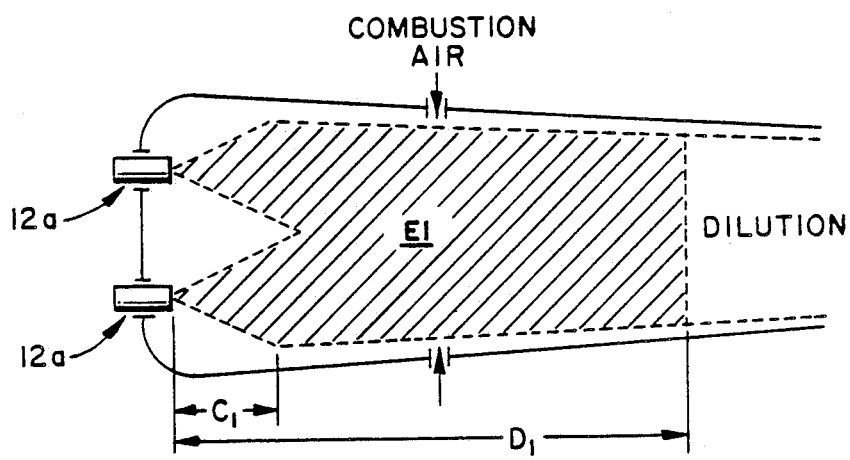
FIG. 2b is a schematic of the combustor of FIG. 2a, showing the regions of high and low intensity combustion.
Figure 2C:
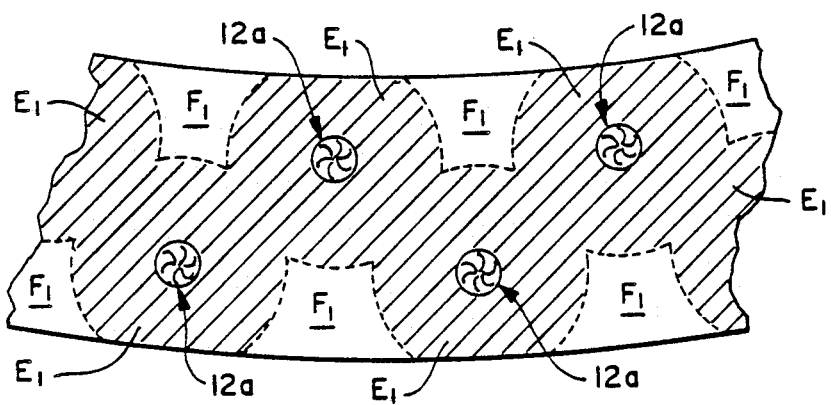
FIG. 2c is an enlarged schematic view of FIG. 2a, showing several fuel injectors.

In accordance with this invention as depicted in FIGS. 2a, 2b, and 2c, the fuel injectors 12a are arranged in the dome generally illustrated by reference numeral 10a to define a triangle configuration as noted by the dashed lines identified by reference letter G. Additionally, the direction of the swirl, from adjacent fuel injectors, alternates, as viewed from FIG. 2a where adjacent swirlers are at different radii. As noted, the inner radius swirler 12a rotates clockwise and the outer radius swirler 12a rotates counter-clockwise, a design which permits the fuel injectors to reinforce one another's swirl without directing the combustion gases against the liner.

Also, as noted by viewing FIG. 2b, because of the mutual reinforcement, fuel tends to be distributed more uniformly and fuel-air mixing tends to be more intense, hence, intense combustion begins closer to the combustor dome as depicted by reference letter C1, and the high intensity burning extends over a shorter expanse as indicated by reference letter D1. Also of significance, because of the arrangement of the fuel injectors, intense burning occupies a larger fraction of the annulus as depicted by the shaded area indicated by reference letter E1. With less combustion length needed for high efficiency burning, the combustor's length can be reduced, which in turn reduces engine length and weight. It will be appreciated from the foregoing that the diameter of the dome of the combustor using this invention is not increased over the diameter of the dome of the prior art combustor depicted in FIGS. 1a, 1b, and 1c.

As is obvious from the foregoing discussion, the present invention places more fuel injectors in a dome area no larger than that of the prior art combustor, a design which increases the influence of fuel injectors and their high mixing rates on the combusting flowfield. As noted in FIG. 2c, the zone of low intensity burning depicted by reference letter F1 occupies a smaller region when compared with the prior art combustor.

Figure 3:
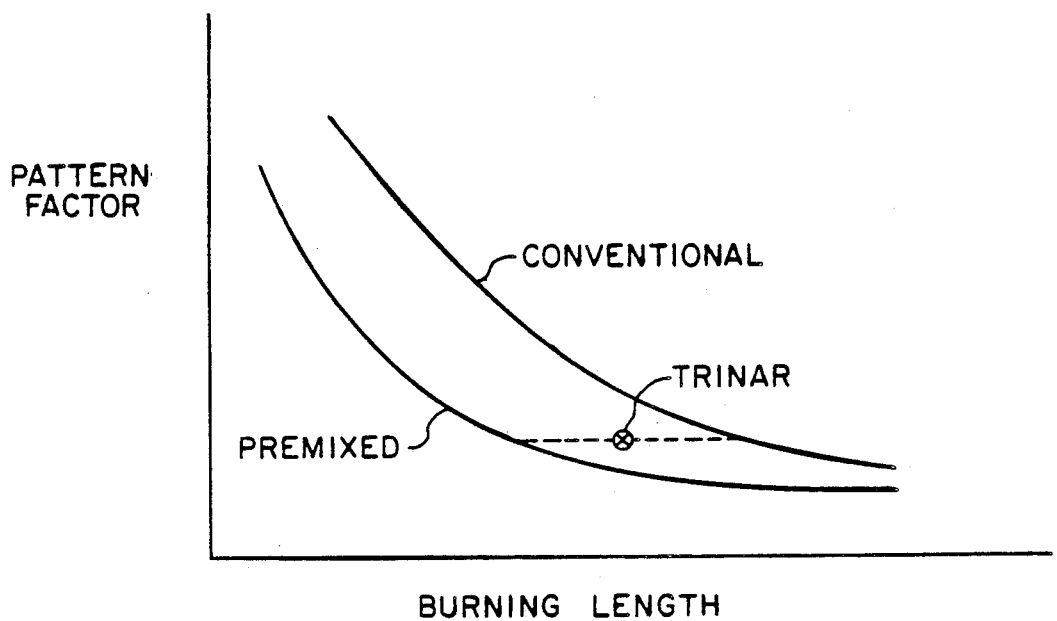
FIG. 3 is a graphical illustration comparing the pattern factor of the prior art fuel injector arrangements with that for the present invention.

As shown in FIG. 3, the arrangement of the fuel injectors as taught by the present invention results in a combustor that is shorter than the prior art combustor without incurring the pattern factor penalty normally associated with combustor length reduction. Moreover, for a fixed length combustor, the pattern factor for the present invention (TRINAR combustor) is less than that for a conventional combustor (FIGS. 1a, 1b, and 1c).

What has been disclosed by this invention is an improved burning concept that allows for a shorter combustor without incurring a pattern factor penalty. Also, fuel-air mixing enhanced to achieve higher intensity combustion in a shorter length. As does the double annular combustor, the present invention permits the use of more fuel injectors, but without increasing dome height or liner surface areas as would be necessary with the double annular combustor.

Although this invention has been shown and described with respect to detailed embodiments thereof, it will be understood by those skilled in the art that various changes in form and detail thereof may be made without departing from the spirit and scope of the claimed invention.

We claim:

1. An annular combustor for a gas turbine engine having an outer annular axially extending wall and an inner annular axially extending wall concentrically disposed relative to said outer wall and defining a combustion chamber, a dome interconnecting said inner wall to said outer wall at the forward end for enclosing the forward end of said combustion chamber, a plurality of fuel nozzles having air swirl means disposed in said dome, said fuel nozzles each arranged in a smaller radii and larger radii tier, three adjacent fuel nozzles of said plurality of fuel nozzles including two of said adjacent fuel nozzles being from one of said larger radii tier or said smaller radii tier and one of said adjacent fuel nozzles being from the other of said larger radii tier or said smaller radii tier and together arranged such that an imaginary line passing through the center of each of said three adjacent fuel nozzles define a triangle, said air swirl means being disposed such that the rotation of the swirl of air in each air swirl means of each tier being in the same direction and the swirl rotation of each air swirl means in the larger radii tier being opposite to the swirl rotation of each air swirl means in the smaller radii tier, the fuel/air emitted from each of said fuel nozzles interacting with the discharge from adjacent fuel nozzles for establishing a fuel/air swirl pattern in the front end of said annular combustor for stabilizing the burning.

* * * * *